United States Patent

Bruhnke et al.

Patent Number: 5,723,060
Date of Patent: Mar. 3, 1998

[54] ANTIFREEZE COMPOSITION

[75] Inventors: John D. Bruhnke; Steven E. Brown, both of Spartanburg, S.C.

[73] Assignee: Milliken Research Corporation, Spartanburg, S.C.

[21] Appl. No.: 816,298

[22] Filed: Mar. 13, 1997

[51] Int. Cl.⁶ .................................................. C09K 5/00
[52] U.S. Cl. ........................... 252/73; 252/75; 252/77; 252/78.1; 8/647
[58] Field of Search .................... 252/73, 75, 77, 252/78.1; 8/647, 657, 661, 662, 675, 676; 540/122, 729

[56] References Cited

U.S. PATENT DOCUMENTS

| | | | |
|---|---|---|---|
| 3,960,740 | 6/1976 | Truett | 252/73 |
| 4,169,203 | 9/1979 | Wingard et al. | 546/76 |
| 5,039,439 | 8/1991 | Hansman, Jr. et al. | 252/70 |
| 5,098,475 | 3/1992 | Winnik et al. | 106/22 |
| 5,102,459 | 4/1992 | Ritter et al. | 106/22 |
| 5,532,111 | 7/1996 | Holmes et al. | 430/281.1 |
| 5,643,493 | 7/1997 | Connor et al. | 252/75 |

*Primary Examiner*—Anthony Green
*Attorney, Agent, or Firm*—Terry T. Moyer; Timothy J. Monahan

[57] ABSTRACT

An antifreeze composition is provided having a polyhydric alcohol, a corrosion inhibitor and a colorant of the formula:

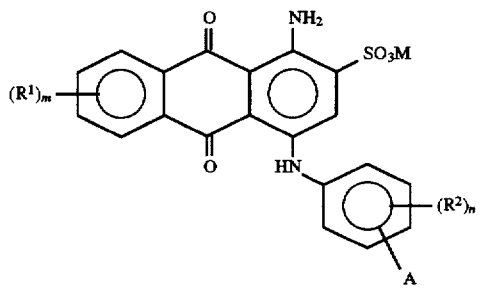

wherein m and n are independently selected from 0, 1, 2 or 3; M is cation; A is $SO_3M$ or $SO_2R^3$, where $R^3$ is alkylene-$SO_3M$; $R^1$ is selected from the group consisting of hydroxy, $C_{1-8}$ alkoxy, $C_{1-8}$ alkyl, amino, sulfoxy, carboxy and $R^2$; and $R^2$ is $NHR^4$, where $R^4$ is triazine or triazine substituted with aminophenylsulfonate, chloro, dichloro, fluoro, or $R^2$ is $CO_2M$.

18 Claims, No Drawings

ANTIFREEZE COMPOSITION

BACKGROUND OF THE INVENTION

This invention is directed to an antifreeze composition containing a polyhydric alcohol, corrosion inhibitor and a 1-amino, 2-sulfonic acid, 4-substituted anilino-anthraquinone dye.

Antifreeze compositions are subjected to temperature extremes and strong oxidizing conditions. Very few colorants have been found, which are stable in such an environment. The commercial market is dominated by Direct Blue 199 (copper phthalocyanine, tetrasulfonic acid), Acid Green 25 (1,4-bis(4'-methyl-3'-phenylsulfonato) amino anthraquinone) and uranine (sodium fluorescein). Acid Green 25 is commonly combined with uranine to give a fluorescent green composition. A short coming of Acid Green 25 is that commercial sources generally have high levels of impurities, which can cause deposits and build up in engines cooling system. Consequently, it is necessary to remove such impurities before the dye may be employed in antifreeze compositions. It is believed that many of the impurities arise from the synthesis method employed, which is to sulfonate Solvent Green 3 (C.I. No. 61565) followed by conversion to the sodium salt.

Antifreeze compositions have been provided with indicators that change color in response to the relative concentrations of glycol and water. Truett, U.S. Pat. No. 3,960,740, disclose a 1,2-diamino anthraquinone dye useful as such an indicator.

Hansman, Jr. et al., U.S. Pat. No. 5,039,439, disclose a de-icing fluid incorporating a fluorescein salt which changes color when the fluid freezes. The de-icing fluid is useful for determining the presence of ice on the exterior surface of an aircraft.

Although a few individual colorants have been identified which meet the rigorous requirements and demands placed on an antifreeze composition, there remains a strong demand for alternative dyes, especially alternatives to Acid Green 25, which overcome the aforementioned shortcomings.

SUMMARY OF THE INVENTION

Therefore, an object of the invention is to provide an antifreeze composition with a blue dye which is stable over a wide range over operating conditions. Another object of the invention is to provide a blue dye which can be blended with a yellow fluorescent dye to produce a green fluorescent antifreeze composition. Still another object of the invention is to provide a blue dye which is relatively free of impurities.

Accordingly, an antifreeze composition is provided which incorporates a blue dye selected from the compounds of the formula:

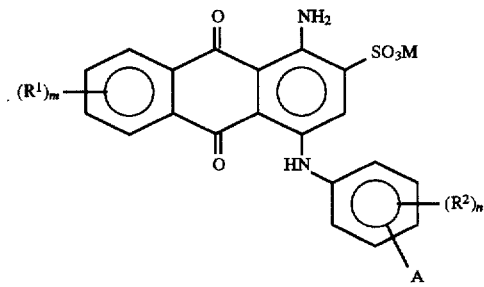

wherein, m and n are independently 0, 1, 2 or 3; M is a cation, such as an alkali metal, alkaline earth metal, zinc or ammonium ion; A is $SO_3M$ or $SO_2R^3$, where $R^3$ is alkylene-$SO_3M$; $R^1$ is a substituent selected from hydroxy, $C_{1-8}$ alkoxy, $C_{1-8}$ alkyl, amino, sulfoxy, carboxy and $R^2$; and $R^2$ is $NHR^4$, where $R^4$ is triazine substituted with aminophenylsulfonate, chloro, dichloro, fluoro, or $R^2$ is $CO_2M$.

Preferably, the colorant includes one or more of the following features:

A is in the meta position;

the colorant is synthesized by the displacement reaction of bromaminic acid, 1-amino-4-bromoanthraquinone-2-sulfonic acid and a meta substituted sulfonic acid or sulfone ester aniline derivative;

m is 0;

n is 1; and/or

M is sodium

The antifreeze composition of the present invention overcomes disadvantages associated with the prior art and has further benefits and advantages discussed herein and as will be apparent to those skilled in the art.

DETAILED DESCRIPTION OF THE INVENTION

Without limiting the scope of the invention, the preferred embodiments and features are hereinafter set forth. Unless otherwise indicated, all parts and percentages are by weight and conditions are ambient, i.e. one atmosphere of pressure and 25° C. Unless otherwise specified aliphatic hydrocarbons are from 1–12 carbon atoms in length..

All of the United States patents cited in the specification are hereby incorporated by reference.

The antifreeze composition of the present invention includes a polyhydric alcohol and a blue dye. Preferably, the composition also includes a corrosion inhibitor. Antifreeze compositions are typically sold as a concentrate, which is then diluted with water when the composition is introduced into a cooling system, to achieve a polyhydric alcohol to water ratio of from about 1:3 to 3:1. Dilution is not necessary, however, and the antifreeze composition may be employed neat.

The main component of the antifreeze composition is a polyhydric alcohol, which is generally an alkylene glycol, alkylene glycol ether or mixtures thereof. By way of example, the polyhydric alcohol may be selected from ethylene glycol, propylene glycol, butylene glycol, glycerol, diethylene glycol and mixtures thereof. Preferably, the polyhydric alcohol is selected from ethylene glycol and propylene glycol.

An effective amount of a corrosion inhibitor is provided to counteract the corrosive effect of water and/or polyhydric alcohol on the radiator and engine components. A wide variety of corrosion inhibitors are known to those skilled in the and generally include alkali metal borates, mercaptobenzothiazole, alkali metal phosphates, silicates, organic acids, amines and polyacrylates. Examples of suitable corrosion inhibitors include the following compounds: sodium tetraborate, mercaptobenzothiazole, alkali metal phosphates, alkali metal meta borates, alkali metal hydroxides, polyethylene polyamine benzotriazole organic acid adducts, diethylenetriamine benzotriazole organic acid adducts, silicates, cyclohexane acids, hydroxy-substituted aromatic carboxylic acids aliphatic organic acids and their salts, aromatic organic acids and their salts, borates, tolytriazoles, hydrocarbyl triazoles, alkyl aromatic organic acids and their salts, polyacrylates and their salts, alkenylaminophosphonate salts, heteropolymolybdates, dicyclopentadiene dicarboxylates, hydrocarbyl sulfonates, sulfophenethylsiloxanes, (silyalkyl)phosphonic acid—silicate polymers, sodium sebacate, methyleneazelaic acid, naphthalene dicarboxylic acid salts, siloxanes, imidazoline and ethanolamine.

The colorant is an anthraquinone dye selected from compounds having the formula:

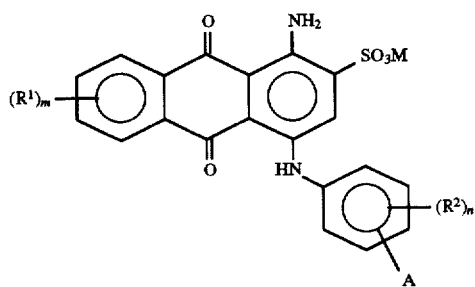

wherein, m and n are independently 0, 1, 2 or 3; M is a cation, such as an alkali metal, alkaline earth metal, zinc or ammonium ion; A is $SO_3M$ or $SO_2R^3$, where $R^3$ is alkylene-$SO_3M$; $R^1$ is a substituent selected from hydroxy, $C_{1-8}$ alkoxy, $C_{1-8}$ alkyl, amino, sulfoxy, carboxy and $R^2$; and $R^2$ is $NHR^4$, where $R^4$ is triazine substituted with aminophenylsulfonate, chloro, dichloro, fluoro, or $R^2$ is $CO_2M$.

Preferred embodiments include compounds where A is in the meta position, n is 1 and/or M is sodium. The colorant may be synthesized by the displacement reaction of 1-amino-4-bromoanthraquinone-2-sulfonic acid (bromaminic acid) and a substituted aniline. The reaction may be carried out by the Ullman condensation mechanism using an aromatic amine or using an aromatic dime such as 1,3-phenylenediamine-4-sulfonic acid, to produce a dye which can then be substituted with a free amino group capable of condensation with the appropriate reactive system.

The aforementioned displacement reaction is well known to those skilled in the art and can be found in the relevant literature, such as: F. Urseanu and L. Floru, *Bromamine Acid-Anthraquinonic Intermediate used in Dyes Syntheses*, Revue Roumaine de Chemie, 21, 3, 427–445 (1976); T. D. Tuong and M. Hida, *Mechanism of the Ullman Condensation Reaction, Part III, Role of the Copper Catalyst*, Journal of Chemical Society, Perkins Transactions II, pp. 676–682 (1973); and T. D. Tuong, *A Novel Catalyst System for the Ullman Condensation in Aqueous Solution, Reaction of a Halogenoanthraquinone with Aniline*, Chemistry Letters, pp. 363–366 (1973). Additional references disclosing the synthesis of anthraquinone dyes, especially reactive dyes, may be found in the following references: *The Chemistry of Synthetic Dyes*, Edited by K. Vankataraman, Academic Press, New York, 1972, Volume VI Reactive Dyes; *The Chemistry and Application of Dyes*, Edited by D. R. Waring and G. Hallas, Plenum Press, New York, 1990, Chapter 3; and Kirk-Othmer, *Encyclopedia of Chemical Technology*, Fourth Edition, John Wiley & Sons, New York, 1993, Volume 8, pp. 809–838.

Preferably, the displacement reaction is carried out with a sulfonated aniline or sulfonated aromatic dime, thereby avoiding subsequent sulfonation of the anthraquinone dye. In that regard the meta substituted aniline is preferred. It is believed that by eliminating the sulfonation step subsequent to the displacement reaction, one avoids the formation of impurities and by products which lead to color loss, deposits and poor performance of the antifreeze composition.

On a neat basis, the antifreeze composition typically includes from 70–99 wt. % of a polyhydric alcohol; 0.1 to 30 wt. % of a corrosion inhibitor; and 0.005 to 5 wt. % of a colorant. Additionally, auxiliaries such as defoamers, surfactants, scale inhibitors, may constitute up to 10 wt. % of the composition. The relative concentration of the components is not deemed to be critical and may be varied without deviating from the scope of the invention.

In one embodiment of the invention, the colorant component of the composition is a blend of a blue dye selected from the compounds of the above formula, and a yellow, uranine dye, to achieve a green composition having a peak absorption in the range of 475 to 675 nm. The concentration of the blue and yellow dye can vary anywhere in the range from 1:99 to 99:1, blue dye to yellow dye, respectively.

The invention may be further understood by reference to the following examples, but is not intended to be unduly limited thereby.

EXAMPLE 1

A blue dye having the formula:

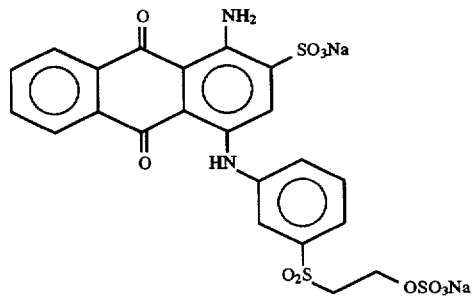

C.I. Reactive Blue 19 and identified as C.I. Reactive Blue 19 was incorporated into an antifreeze composition. The composition contained approximately: 0.02% dye; 90% ethylene glycol; 5% diethylene glycol; 3% water; and 2% borax.

The stability of the dye in the antifreeze composition was tested by ASTM D 1384-87 Glassware Test. Briefly, the antifreeze composition is mixed with a "corrosive water" composition to give a solution having a freezing point of 0°±2° F. (−18°±1° C.) (approximately 33% antifreeze composition by volume). The corrosive water solution is obtained by dissolving 148 mg sodium sulfate, 165 mg sodium chloride and 138 mg sodium bicarbonate in one liter of water. The antifreeze corrosive water composition is placed in a kettle along with a variety of metal test coupons. The composition is heated to 190° F. (88° C.) for 366 hours with air sparge. Water was added regularly to compensate for loss of evaporation.

The composition was sampled before heating and at the end of the 366 hour test and the absorptivity was measured at the peak absorbance wavelength. The ratio of the absorptivity was determined as:

absorptivity after/absorptivity before×100=% of absorptivity retained.

The absorptivity retained in this example was 101%.

EXAMPLE 2

The procedure of Example 1 was followed in all respects except that a dye of the following formula:

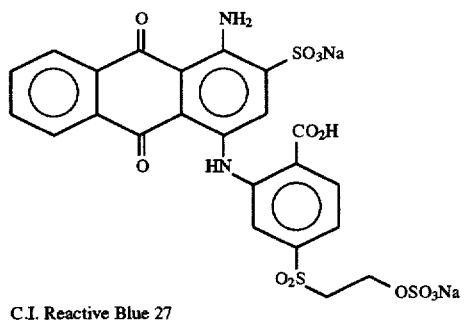

C.I. Reactive Blue 27 and identified as C.I. Reactive Blue 27 was used.

The stability of the dye in the antifreeze composition was tested by ASTM D 1384-87 Glassware Test and found to be 92% absorptivity retained.

EXAMPLE 3

The procedure of Example 1 was followed in all respects except that a dye of the following formula:

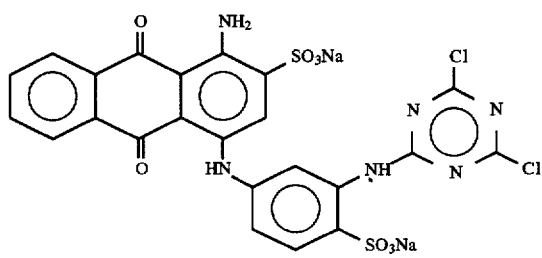

C.I. Reactive Blue 4 and identified as C.I. Reactive Blue 4 was used.

The stability of the dye in the antifreeze composition was tested by ASTM D 1384-87 Glassware Test and found to be 105% absorptivity retained.

EXAMPLE 4

The procedure of Example 1 was followed in all respects except that a dye of the following formula:

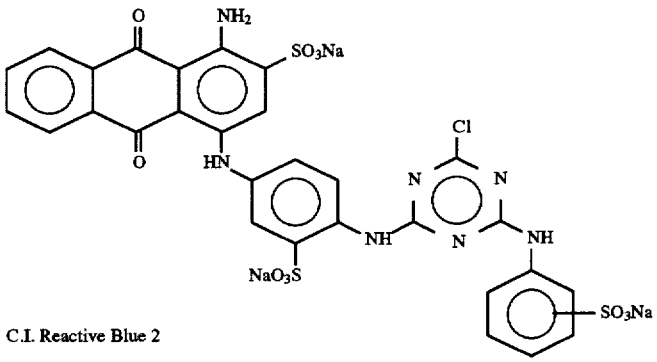

C.I. Reactive Blue 2 and identified as C.I. Reactive Blue 2 was used.

The stability of the dye in the antifreeze composition was tested by ASTM D 1384-87 Glassware Test and found to be 97% absorptivity retained.

The colorants incorporated in the antifreeze composition of the present invention, preferably have a retained absorptivity of 80% or greater, most preferably 90% or greater, after the antifreeze composition is tested according to the ASTM D 1384-87 Glassware Test.

There are of course, many alternate embodiments and modifications of the invention which are intended to be included within the scope of the following claims.

What we claim is:

1. An antifreeze composition comprising a polyhydric alcohol, a corrosion inhibitor and a colorant of the formula:

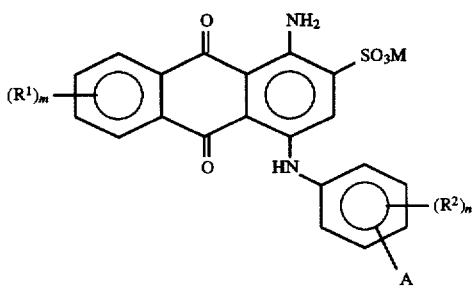

wherein m and n are independently selected from 0, 1, 2 or 3; M is cation; A is $SO_3M$ or $SO_2R^3$, where $R^3$ is alkylene-$SO_3M$; $R^1$ is selected from the group consisting of hydroxy, $C_{1-8}$ alkoxy, $C_{1-8}$ alkyl, amino, sulfoxy, carboxy and $R^2$; and $R^2$ is $NHR^4$, where $R^4$ is triazine or triazine substituted with aminophenylsulfonate, chloro, dichloro, fluoro, or $R^2$ is $CO_2M$.

2. The composition of claim 1 wherein A is in the meta position.

3. The composition of claim 1 wherein the colorant is selected from the group consisting of Reactive Blue 2, Reactive Blue 4, Reactive Blue 5, Reactive Blue 19 and Reactive Blue 27 dye.

4. The composition of claim 1 wherein the colorant is Reactive Blue 19 dye.

5. The composition of claim 1 wherein said polyhydric alcohol is selected from the group consisting of ethylene glycol and propylene glycol.

6. An antifreeze composition comprising on a neat basis from

70–99 wt. % of a polyhydric alcohol;
0.1 to 30 wt. % of a corrosion inhibitor; and
0.005 to 5 wt. % of a colorant of the formula:

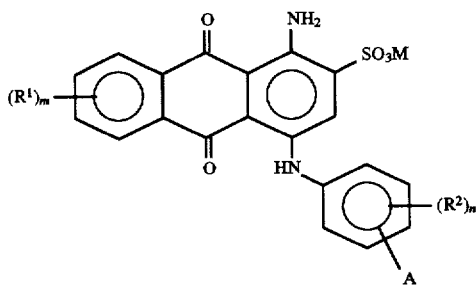

wherein m and n are independently selected from 0, 1, 2 or 3; M is cation; A is $SO_3M$ or $SO_2R^3$, where $R^3$ is alkylene-$SO_3M$; $R^1$ is selected from the group consisting of hydroxy, $C_{1-8}$ alkoxy, $C_{1-8}$ alkyl, amino, sulfoxy, carboxy and $R^2$; and $R^2$ is $NHR^4$, where $R^4$ is triazine or triazine substituted with aminophenylsulfonate, chloro, dichloro, fluoro, or $R^2$ is $CO_2M$.

7. The composition of claim 6 wherein A is in the meta position.

8. The composition of claim 6 wherein the colorant is selected from the group consisting of Reactive Blue 2, Reactive Blue 4, Reactive Blue 5, Reactive Blue 19 and Reactive Blue 27 dye.

9. The composition of claim 6 wherein the colorant is Reactive Blue 19 dye.

10. The composition of claim 1 wherein said polyhydric alcohol is selected from the group consisting of ethylene glycol and propylene glycol.

11. An antifreeze composition comprising on a neat basis from 0.005 to 5 wt % of a blue colorant of the formula:

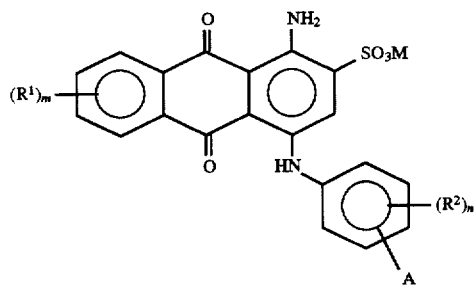

wherein m and n are independently selected from 0, 1, 2 or 3; M is cation; A is $SO_3M$ or $SO_2R^3$, where $R^3$ is alkylene-$SO_3M$; $R^1$ is selected from the group consisting of hydroxy, $C_{1-8}$ alkoxy, $C_{1-8}$ alkyl, amino, sulfoxy, carboxy and $R^2$; and $R^2$ is $NHR^4$, where $R^4$ is triazine or triazine substituted with aminophenylsulfonate, chloro, dichloro, fluoro, or $R^2$ is $CO_2M$.

12. The composition of claim 11 wherein A is in the meta position.

13. The composition of claim 11 wherein the colorant is selected from the group consisting of Reactive Blue 2, Reactive Blue 4, Reactive Blue 5, Reactive Blue 19 and Reactive Blue 27 dye.

14. The composition of claim 11 wherein the colorant is Reactive Blue 19 dye.

15. The composition of claim 11 further comprising sodium fluorescein wherein the blue colorant and sodium fluorescein together comprise from 0.005 to 5 wt. % of the composition.

16. The composition of claim 11 wherein m is 0.

17. The composition of claim 11 wherein the blue colorant has a retained absorptivity of 80% or greater, after the composition has been tested according to ASTM D 1384-87 Glassware Test.

18. The composition of claim 11 wherein the blue colorant has a retained absorptivity of 90% or greater, after the composition has been tested according to ASTM D 1384-87 Glassware Test.

* * * * *